TUNING UNIT

Filed Dec. 7, 1948

INVENTOR.
WARREN J. OSTREICHER

BY Theodore Haefner
ATTORNEY.

Patented Oct. 14, 1952 2,614,248

UNITED STATES PATENT OFFICE 2,614,248

TUNING UNIT

Warren J. Ostreicher, New York, N. Y., assignor to Tele-Tone Radio Corporation, a corporation of New York Application December 7, 1948, Serial No. 64,009

9 Claims. (Cl. 336—131)

This invention relates to a tuning unit and more particularly to a unit adapted to switch a number of high frequency tuning circuits such as used in the reception of a corresponding number of television channels.

It is an object of the invention to provide a compact tuning unit which is inexpensive in manufacture and assembly and yet sufficiently accurate in operation.

Another object of this invention is a tuning unit adapted to a relatively great number of tuning circuits, and yet capable of still higher enlargement without any substantial change in the general arrangement of the structure. It is therefore a further object of this invention to arrange several parallel terminal disks on a common support with inductances of suitable type and numbers circumferentially supported thereon.

A more specific object of this invention is the support of an induction or inductors of the linear or circular winding type in a position substantially parallel to a disk between adjacent terminals thereof.

In a modification of the invention, the inductors are supported in a position substantially perpendicular to the disks between adjacent terminals of different disks.

It is also an object of this invention to permit easy access to the various tuning elements or coils of the tuning unit, for assembly and for further adjustment.

In accordance with another feature of this invention, the tuning element or coils are arranged substantially spaced from the supporting insulating disk, preferably outside the circumference thereof, above, below, or along the disk.

As a result of this good accessibility, it is a further object of this invention to support special type inductors such as a coil comprising an insulating tube supporting the windings and having terminals attached to the ends of the tube. The insulating tube is provided with a conductive slug arranged adjustably therewithin and the terminals of this coil may be formed in such a way as to cooperate with the disk terminals for supporting body and coil at a predetermined distance.

Another type of inductance preferred in connection with the invention is a linear conductor connected to and supported on adjacent terminals of an insulating disk and having a curvature and/or length corresponding to a predetermined inductance value.

A third type of inductance useful for the invention is a coil consisting of circular windings which are not supported on an insulating coil and which are freely suspended apart from being supported by their terminals on an insulating disk.

Still another object of this invention is to permit the combined use of a great variety of different types of coils.

A more specific object of this combination is the simultaneous use of inductances of the linear and circular types, and of the types supported and unsupported on an insulating tube. A preferred structure of this kind comprises one pair of insulating disks parallelly spaced and having coils supported peripherally between adjacent terminals of different disks. In addition, coaxially with that pair of disks, there are provided two similar insulating disks also parallelly spaced. Each of the additional disks has certain pairs of adjacent terminals supporting inductances of the linear conductor type and of predetermined length and curvature. Another pair or more pairs of adjacent terminals support a circular coil or coils wound around an insulating tube.

A third pair or several pairs of adjacent terminals carry a circular conductor supported on the terminals.

In accordance with this invention, these inductances or coils are arranged substantially outside of the circumference of the associated insulating disks and all the disks are supported around a common shaft for the simultaneous adjustment of several coils corresponding to the different tuning circuits to be switched.

Still another variation in the inductance permitted by the invention without affecting the general structure of the tuning unit consists in varying the winding number and/or the spacing of a circular conductor type inductance, which may or may not be supported on an insulating body.

A further object of this invention is the reduction of interference between the inductances or coils and especially between the inductances or coils of different terminal disks or aggregations of disks, with or without additional screening elements.

More specifically, the terminal disks supporting coils on insulating tubes therebetween in superimposed position, are spaced more closely than the terminal disks supporting coils on adjacent terminals.

Also the distance between the different type sets or pairs of disks is greater than the distance of the more closely spaced disks. Such greater distance is preferably of the order of the distance of the less closely spaced terminal disks.

Any number of disks, any type of inductance and any sort of combination of inductances may be provided in the unit in accordance with this invention.

Also other circuit elements such as resistors, condensers or the like of any type and number may be combined with the unit without departing from the scope of this invention.

This and other objects of the invention will be apparent from the accompanying drawings and the description which follows.

Figures 1, 2, 3:
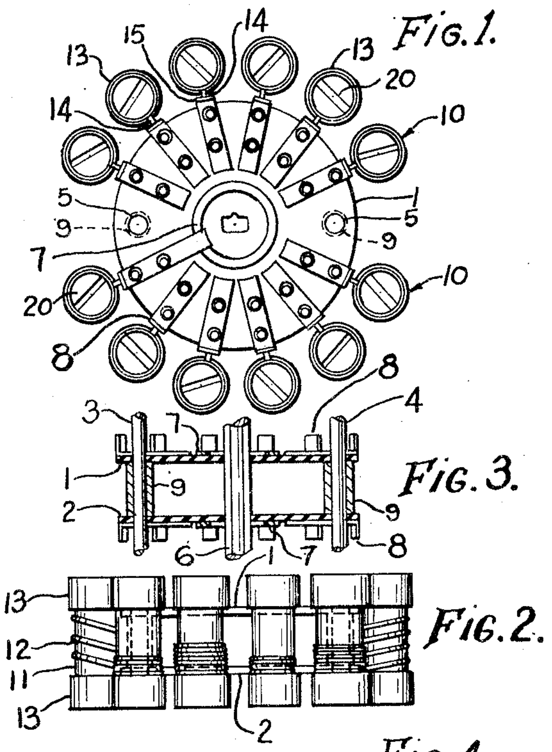
Fig. 1 and Fig. 2 are top and front views, respectively, of a pair of terminal disks arranged for a common shaft and supporting tube insulated type coils.
Fig. 3 is a sectional view of a pair of such terminal disks. The supporting rods pass through the disk spacers and the common shaft, are also shown.

In Figs. 1, 2 and 3, parts 1 and 2 designate a pair of insulating disks supported in stationary position on longitudinal side rods 3 and 4 extending through opening 5 of terminal disks 1 and 2; central shaft 6 is arranged to extend through disks 1, 2 and parallel to rods 3 and 4. Shaft 6 carries one or more contacts (not shown) adapted to bring in contact a central disk terminal 7 with any one of a number of terminals 8 circumferentially attached to insulating disks 1, 2.

This contact wafer arrangement is well known per se, is not claimed and need not be described in detail.

Terminals 7 and 8 may be disposed on one or on both sides of the insulating disks and the terminals may have any number, shape, and relative arrangement without exceeding the scope of the invention. 9 is a metal spacer.

Between adjacent terminals of the different disks 1, 2 there are supported the inductance coils 10 in relatively upright position.

Figures 4, 5, 8:
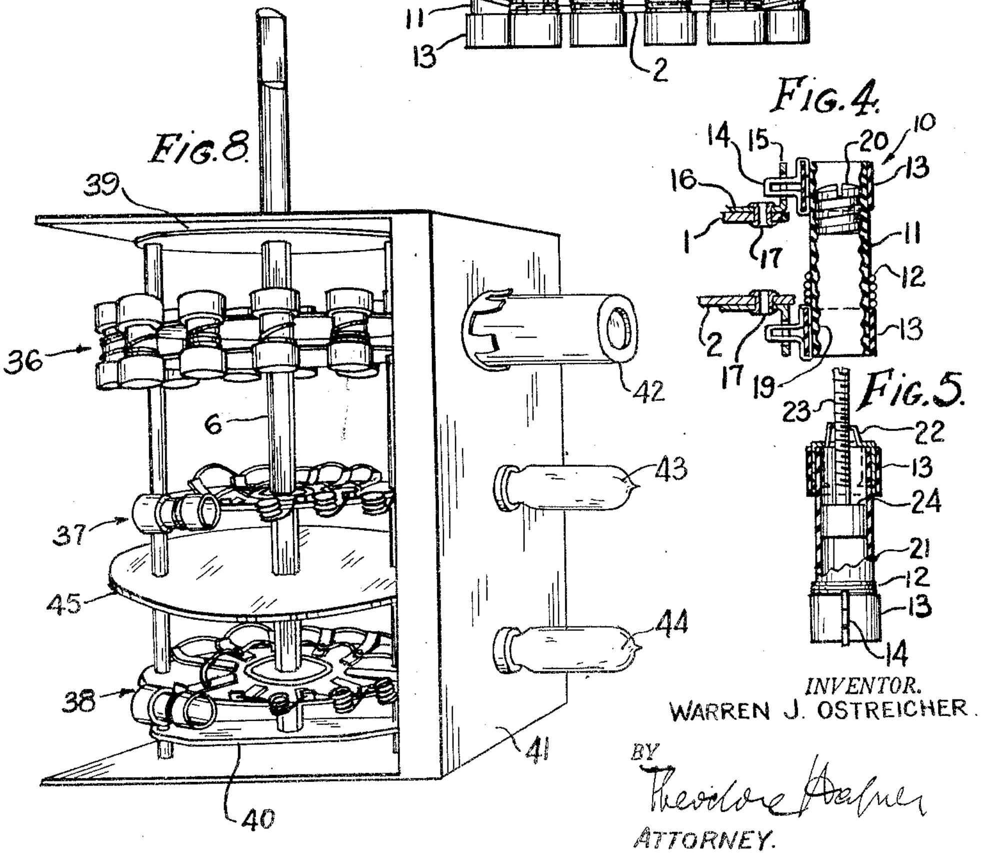
Fig. 4 shows the attachment of a tube insulated coil to the superimposed terminal disks.
Fig. 5 shows an alternative type of coil.
Fig. 8 shows assembled a pair of terminal disks with tube supported coils or inductances; and another pair of terminal disks of substantially similar construction each supporting a combination of tube supported and unsupported circular and linear type inductances.

Fig. 4 shows a section through such an inductance coil. Each coil consists of a tubular member 11 around which the coil wire 12 is wound in a predetermined number of windings and at a spacing corresponding to a predetermined inductance value. The ends of tube 11 are provided with insulating sleeves 13 of a material similar to that of tube 11 such as paper. Sleeves 13 support terminal lugs 14 fitting into corresponding lugs 15 of terminals 16 attached by rivets 17 to insulating disks 1, 2. The inside of tube 12 is threaded at 19 to permit a metal slug 20 to be adjusted from the outside to desired inductance variations without interfering with the remainder of the unit.

A modification of such a coil is shown in Fig. 5. The insulating tube 21 is not threaded but provided at its end with a metal cap 22 which engages with a threaded brass screw 23 which may be inserted into the coil. Attached to the inner end of brass screw 23 there is a metal slug 24. The desired adjustment in inductance is obtained by positioning slug 24 through adjustment of screw 23. In this way it is not necessary to thread the inside of the insulating tube.

Figures 6, 7:
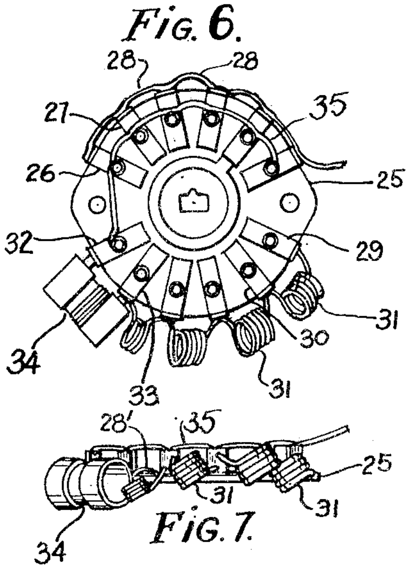
Figs. 6 and 7 show in side and top views, respectively, a single terminal disk with different type coils arranged therein.

Figs. 6 and 7 show different types of inductances attached to a terminal disk 25 similar to those illustrated in Fig. 1. Between certain pairs 26, 27 of adjacent terminals of terminal disk 25, linear conductors 28 of different length and/or curvature are supported, corresponding to different inductance values. Between another pair of adjacent terminals 29, 30, coils 31 are arranged which are free and only supported by the terminal lugs. A third pair 32, 33 of adjacent terminals supports a tube supported coil 34 in a position substantially parallel to the terminal disk.

Furthermore, some of these terminal pairs such as 26, 27 support two inductors such as 28 and 35, arranged physically and electrically substantially in parallel.

In Figs. 1, 2 and 3, coils 10 are shown supported between superimposed terminals of terminal disks 1 and 2 in a position substantially perpendicular to the disks.

Relatively free coils 31 may be supported in any desired position substantially parallel, or perpendicular, or as shown in Figs. 6, 7 at an angle with respect to the associated terminal disk 25.

The single conductor inductances 28, 35 are arranged substantially parallel to disk 25, forming a single wire or wires.

In all these cases the inductances or coils are shown arranged substantially outside of the circumference of the terminal disks.

Fig. 8 shows an assembly 36 of a pair of terminal disks as shown in Figs. 1, 2 and 3 and of a pair of single disks 37, 38 such as shown in Figs. 5 and 6 in a single structure, around a central shaft 6 side rods 3 and 4 which are supported in end plates 39, 40. This shaft 6 as already stated above carries the several contacts causing the different switching operations for the various tuning circuits.

In order to minimize interference, the distance between single disk 37 and the disk pair 36 is greater than the distance between the disks of disk pair 36. In addition, disks 37 and 38 are separated by a greater distance than the disks of disk pair 36, i. e. at a distance of about the order of the distance of disk 37 from disk pair 36.

Additional screening may be achieved, if necessary, by a metal plate 45 arranged between pair 36 and single disk 37. Side plate 41 may be used to support tubes 42, 43 and 44 of the oscillator circuit or any other circuit connected to the tuning unit.

Other circuit elements may be attached, connected or coupled to the elements shown or described, without exceeding the scope of the invention.

What I claim is:

1. In a tuning unit comprising at least two insulating disks parallelly spaced and a common support therefor; each disk having terminals only circumferentially arranged thereon, and at least one inductance unit connected to and supported on said terminals only; said unit including a hollow insulating body supporting the coil and terminals attached to the ends of said body; said body being provided with a conductive slug arranged adjustably therewithin and exposed to the outside so as to be adjusted without requiring removal of said inductance unit from its supporting terminals, and said unit terminals being adapted to cooperate with the disk terminals for supporting said body and said coil.

2. Unit according to claim 1 wherein a coil is suported in a position substantially parallel to a disk between adjacent terminals thereof.

3. Unit according to claim 1 wherein the coil is suported in a position substantially perpendicular to the disks between adjacent terminals of different disks.

4. Unit according to claim 1 comprising at least one additional insulating disk arranged coaxially with said two disks and having terminals circumferentially arranged thereon; and at least one linear conductor connected to and supported on adjacent terminals of said additional disk and having a curvature corresponding to predetermined inductance values.

5. Unit according to claim 1 comprising at least one additional disk arranged coaxially with said two disks and having terminals circumferentially arranged thereon and a number of single linear conductors each connected to and supported on adjacent terminals of said additional disks, and having a curvature corresponding to predetermined inductance values; the different single linear conductors being formed of one single linear conductor continually extending over at least three of said terminals.

6. Unit according to claim 1 comprising at least one additional insulating disk arranged coaxially with said two disks and having terminals circumferentially arranged thereon; at least one linear conductor connected to and supported on adjacent terminals of said additional disk and having a curvature corresponding to a predetermined inductance value; and at least another linear conductor connected to and supported on said adjacent terminals substantially parallel to said first single linear conductor, and having a curvature corresponding to predetermined inductance values.

7. Unit according to claim 1 comprising at least one additional insulating disk arranged coaxially with said two disks and having terminals circumferentially arranged theron; at least one linear conductor connected to and supported on adjacent terminals of said additional disk and having a curvature corresponding to a predetermined inductance value; and at least another linear conductor connected to and supported on said adjacent terminals substantially parallel to said first single linear conductor; and having a curvature corresponding to a predetermined inductance value, said two linear conductors each being formed of one single linear conductor continually extending over at least three of said terminals.

8. Unit according to claim 1 comprising at least one additional insulating disk arranged coaxially with said two disks and having terminals circumferentially arranged thereon; and at least one linear conductor connected to and supported on adjacent terminals of said additional disk and having a curvature corresponding to a predetermined inductance value; and at least two more coils, one including an insulating tube and circular windings supported thereon, and the other having circular windings substantially unsupported except for the fact that said two coils are both connected to and supported on adjacent pairs of terminals of said additional disk, in a position substantially parallel to and outside of the circumference of said disk.

9. Unit according to claim 1 wherein said coils are supported between adjacent terminals of different disks, and wherein there are provided at least two additional insulating disks parallelly spaced and arranged coaxially with said first two disks; each of said two additional disks have adjacent terminals interconnected by coils supported on said terminals; said additional coils including linear conductors of predetermined length and curvature, at least one circular winding coil and an insulating tube supported thereon, and at least another circular winding coil unsupported apart from being supported on adjacent terminals of at least one of said additional disks; all said coils being arranged substantially outside of the circumference of said insulating disks and all said disks being supported on a common shaft for simultaneous adjustment corresponding to the different tuning circuits to be switched; said first pair of disks being spaced more closely than said second pair of disks; and said first pair being spaced from said second pair at a distance of the order of the spacing provided between the disks of said second pair.

W. J. OSTREICHER.

REFERENCES CITED

The following references are of record in the file of this patent:

UNITED STATES PATENTS

| Number | Name | Date |
|---|---|---|
| 2,062,253 | Walker et al. | Nov. 24, 1936 |
| 2,261,778 | Reid | Nov. 4, 1941 |
| 2,318,415 | Patzschke et al. | May 4, 1943 |
| 2,340,731 | Boyson | Feb. 1, 1944 |
| 2,423,152 | Mitchell | July 1, 1947 |
| 2,497,747 | Valdettero | Feb. 14, 1950 |

FOREIGN PATENTS

| Number | Country | Date |
|---|---|---|
| 611,651 | France | Oct. 8, 1926 |